United States Patent [19]

Taghezout

[11] Patent Number: 5,028,857
[45] Date of Patent: Jul. 2, 1991

[54] METHOD OF CONTROLLING A BI-DIRECTIONAL STEPPING MOTOR AND A BI-DIRECTIONAL STEPPING MOTOR ADAPTED TO BE CONTROLLED BY THIS METHOD

[75] Inventor: Daho Taghezout, Schaffhouse, Switzerland

[73] Assignee: ETA SA Fabriques d'Ebaches, Grenchen, Switzerland

[21] Appl. No.: 349,727

[22] Filed: May 10, 1989

[30] Foreign Application Priority Data

May 11, 1988 [CH] Switzerland ................ 01809/88

[51] Int. Cl.$^5$ .............................................. H02P 8/00
[52] U.S. Cl. ...................................... 318/696; 368/157
[58] Field of Search ................. 318/696, 685; 368/157

[56] References Cited

U.S. PATENT DOCUMENTS

| | | | |
|---|---|---|---|
| 4,066,947 | 1/1978 | Nakajima | 318/696 |
| 4,144,467 | 3/1979 | Nakajima | 310/49 R |
| 4,371,821 | 2/1983 | Laesser | 318/696 |
| 4,439,717 | 3/1984 | Berney | 318/696 |
| 4,460,859 | 7/1984 | Rémar et al. | 318/157 |
| 4,471,284 | 9/1984 | Guérin | 318/696 |
| 4,514,676 | 4/1985 | Grandjean et al. | 318/696 |
| 4,546,278 | 10/1985 | Xuan | 310/49.R |
| 4,633,156 | 12/1986 | Besson et al. | 318/696 |

FOREIGN PATENT DOCUMENTS

| | | |
|---|---|---|
| 57663 | 8/1982 | European Pat. Off. . |
| 92522 | 10/1983 | European Pat. Off. . |
| 2611319 | 4/1977 | Fed. Rep. of Germany . |

*Primary Examiner*—William M. Shoop, Jr.
*Assistant Examiner*—Saul M. Bergmann

[57] ABSTRACT

A method for improving the efficiency of a stepping motor (1) comprising a rotor (15) having a permanent magnet (16) producing a first magnetic field, as well as a first coil (13) and a second coil (14) for supplying to the magnet (16) respectively a second magnetic field (18) and a third magnetic field (19) symmetrical to one another in relation to an axis of symmetry (7) intersecting the axis of rotation (15a) of the rotor (15). The method comprises supplying to the motor (1), to make its rotor (15) turn in a given sense, drive pulses during which the two coils (13, 14) are supplied simultaneously by currents having a sense and an intensity such that, at the beginning of each drive pulse, the resultant magnetic field produced by the vectorial addition, in the magnet (16), of the second field (18) and the third field (19) forms, with another magnetic field (17) that results from the vectorial addition, in the magnet (16) of the two parts of the field produced by the latter magnet each of which flows through one of the coils (13, 14), an angle between 110° and 160° and having a sense, measured from the latter resultant field (17) towards the former, identical to the sense of rotation of the rotor (15). The claimed motor (1) may advantageously be controlled by this method due to the fact that its positioning means (21,22) are arranged such that, in each of the rest positions of the rotor (15), the aforesaid second resultant field (17) forms an angle (A) of from 20° to 70° with the axis of symmetry (7).

8 Claims, 3 Drawing Sheets

METHOD OF CONTROLLING A BI-DIRECTIONAL STEPPING MOTOR AND A BI-DIRECTIONAL STEPPING MOTOR ADAPTED TO BE CONTROLLED BY THIS METHOD

FIELD OF THE INVENTION

The present invention concerns a method of controlling a stepping motor rotatable in both senses, comprising :

a rotor comprising a permanent magnet producing a first magnetic field;

a first coil, traversed by a first part of said first magnetic field and intended to produce a second magnetic field in response to a first current;

a second coil, traversed by a second part of said first magnetic field and intended to produce a third magnetic field in response to a second current, said first and second parts of the first magnetic field forming in said permanent magnet a first resultant field; and positioning means for maintaining said rotor in or for returning said rotor to any one of a plurality of rest positions;

said method comprising the production of said currents and the simultaneous supply thereof to the coils each time said rotor must turn by one step.

The present invention also concerns a stepping motor rotatable in both senses, comprising :

a rotor comprising a permanent magnet producing a first magnetic field;

a first coil, transversed by a first part of said first magnetic field, and intended to produce a second magnetic field;

a second coil, traversed by a second part of said first magnetic field, and intended to produce a third magnetic field;

first means for applying said second magnetic field to said permanent magnet in a first direction;

second means for applying said third magnetic field to said permanent magnet in a second direction symmetrical to said first direction relative to an axis of symmetry; and positioning means for maintaining said rotor in or for returning said rotor to any one of a plurality of rest positions.

BACKGROUND OF THE INVENTION

Stepping motors conforming to the general definition given above are used, for example, in electronic timepieces for driving their display members which usually are indicator hands.

U.S. Pat. No. 4,371,821 describes such a stepping motor which comprises, as an example, a stator having three pole faces defining therebetween a substantially cylindrical space receiving the permanent magnet of the rotor whose axis of rotation coincides substantially with the axis of this cylindrical space.

The permanent magnet of the rotor has an axis of magnetization intersecting the axis of rotation at an angle of about 90°.

Each arcuate pole face extends over about 120° in plan view of the motor and is situated at a first end of a pole piece.

Each of these first ends of the pole pieces is connected to the first end of the two other pole pieces by zones of high reluctance situated on either side of the corresponding pole piece.

The second ends of the first and the second pole pieces are connected by a first core on which is wound a first coil, and the second ends of the first and the third pole pieces are also connected by a second core on which is wound a second coil.

Finally, the stator of the motor comprises means for producing a positioning torque of the rotor which tends to maintain it in or return it to either of two rest positions. These rest positions are those in which the axis of magnetization of the permanent magnet has a direction designated as the rest direction which is the direction of a straight line cutting the axis of rotation of the rotor at an angle of about 90° and passing through the middle of the first pole face. This straight line is thus the axis of symmetry of the first pole face, as well as the axis of symmetry of the second and third pole faces relative to one another.

The magnetic fields produced by the coils when a current flows therethrough thus assume, in the cylindrical space defined by the pole faces, directions symmetrical to one another relative to this axis of symmetry.

In another embodiment described in the above-mentioned U.S. Pat. No. 4,371,821, the stator of the motor does not have a pole piece and the two coils, without a core, have the shape of substantially flat frames partially surrounding the rotor's magnet.

The planes of these coils form an angle whose bisecting plane contains the axis of rotation of the rotor.

The directions of the magnetic fields produced by these coils are thus symmetrical in relation to an axis of symmetry in this bisecting plane and perpendicular to the axis of rotation of the rotor.

In this embodiment too, the motor includes means for producing a rotor-positioning torque tending to maintain the rotor in or to return it to either one of two angular rest positions which be are the angular positions in which the axis of magnetization of the rotor's permanent magnet has a rest direction which is the direction of the above mentioned axis of symmetry.

The aforementioned U.S. Pat. No. 4,371,821 also describes a method of controlling the above-described motor.

This method consists in delivering to the coils drive pulses made up of two parts. During the first part of each drive pulse, the coils are supplied with voltages which are equal in absolute value and have a polarity such that the magnetic field applied to the rotor's magnet, and which is the resultant produced by the addition of the magnetic fields produced by these coils, has a direction perpendicular to the above-defined rest direction and a sense such that the rotor begins to turn in the desired sense of rotation. At the end of the first part of each drive pulse, the polarity of the voltage supplied to one of the coils is reversed in such a manner that the resultant magnetic field has a direction parallel to the rest direction and a sense opposite to the sense that the axis of magnetization of the rotor's magnet had before the drive pulse began.

Each of these two parts of the drive pulse lasts for some milliseconds.

This motor has the advantage, all other factors being equal, of producing an identical torque in both senses of rotation.

However, for the motor to operate properly and at maximum efficiency, it would be necessary for the second part of the drive pulse to begin when the rotor has turned by exactly 90°.

This is hardly ever achieved in practice, because the angle through which the rotor turns during the first part of the drive pulse depends on the applied resisting torque that has to be overcome.

When the motor's coils are supplied in the way that they are supplied during the first part of the drive pulse, the drive torque has its maximum value when the rotor occupies one of its rest positions and drops rapidly when the rotor begins to turn. Moreover, when the coils are supplied in the way that they are supplied during the second part of the drive pulse, the drive torque is zero when the rotor occupies one of its rest positions and increases quite slowly as a function of the angle of rotation of the rotor.

At the beginning of the second part of the drive pulse, the torque produced by the motor thus has a value which is only a fraction of the maximum torque it can produce, and this fraction decreases as the opposing or resisting torque applied to the rotor increases.

As a result, the efficiency of the motor is quite low and, to drive a given mechanical load, it consumes more electrical energy than a conventional stepping motor rotatable in only one direction.

Furthermore, if the opposing torque applied to the rotor is low, the rotor reaches the position where it has turned by 90° before the first part of the drive pulse has finished.

The electrical energy delivered to the motor during the end of this first part of the drive pulse is dissipated as pure loss, which further decreases the efficiency of this motor.

Moreover, after having reached the above-mentioned position, the rotor oscillates about this position until the end of the first part of the drive pulse. There is therefore a non-negligeable risk that the second part of the drive pulse drives the rotor in a sense opposite the desired sense instead of making it finish its step correctly.

Reliable operation of the motor therefore cannot be guaranteed.

Additionally, because it is necessary to reverse the sense of the current in one of the coils during each drive pulse, it is difficult to combine the above-described control circuit of the motor with a circuit of well known type for reducing the consumption of a stepping motor by adjusting the duration of the supplied drive pulses to the mechanical load it drives.

U.S. Pat. No. 4,514,676 proposes a method of controlling the above-described motor that avoids some of these drawbacks.

According to this method, one of the coils is supplied, alone, for turning the rotor in one sense, and the other coil is supplied, alone, for turning the rotor in the other sense.

For each of the rest positions of the rotor, the polarity of the voltage delivered to the coil corresponding to the desired sense of rotation is selected in such a manner that the magnetic field applied to the rotor's magnet makes, when this rotor is in this rest position, an angle of about 120° with the rest direction of the rotor.

When this motor is controlled according to this method, the torque it produces begins by increasing, goes through a maximum value when the rotor has turned through about 30° and then decreases.

This variation of the drive torque as a function of the angle of rotation of the rotor represents an improvement over the case where the motor is controlled in the manner described in the above-mentioned U.S. Pat. No. 4,371,821. Also, most of the above-mentioned drawbacks are obviated.

Nevertheless, because of the fact that only a single coil is supplied, and all other factors being equal, the losses in this coil by the Joule effect are higher than those produced when the motor is controlled in the manner described in the above-mentioned U.S. Pat. No. 4,371,821. Therefore, the efficiency of the motor is not substantially improved by the latter control method.

U.S. Pat. No. 4 546 278 also describes a motor corresponding to the above definition. This motor and its control method will not be repeated here except to mention that this method has about the same drawbacks as the method described in U.S. Pat. No. 4,371,821.

SUMMARY OF THE INVENTION

An object of the present invention is to propose a method of controlling a stepping motor corresponding to the general definition given above by means of which the torque produced by the motor has improved variation characteristics as a function of the angle of rotation of the rotor, and the efficiency of the motor is substantially improved as well as its reliability of operation.

This object is achieved by the claimed method wherein the currents supplied to the coils are produced with the same sense during the entire duration of their supply to these coils and with intensities such that at the beginning of current supply and when the rotor occupies one of its rest positions, the first above-defined resultant field forms an angle having a value between about 110° and about 160° with a second resultant field which is the resultant magnetic field produced by the vectorial addition of the magnetic fields produced in the permanent magnet by the flow of currents in said coils, the sense of said currents furthermore being such that this angle has a sense, when measured from the first resultant magnetic field towards the second resultant magnetic field which is the sense in which the rotor should turn.

Another object of the present invention is to provide a stepping motor which is particularly suited to be controlled by the above method.

This further object is achieved by the claimed motor which is characterized by the fact that its positioning means are arranged in such a manner that, in each of the rest positions of its rotor, the resultant magnetic field formed in the permanent magnet of this rotor by the two parts of the magnetic field produced by this magnet and each passing through one of the coils makes an angle from about 20° to about 70° with an axis of symmetry of the directions of the magnetic fields produced in the permanent magnet by the coils when current flows therein.

BRIEF DESCRIPTION OF THE DRAWINGS

The invention will now be described in detail with reference to accompanying drawings, in which.

DESCRIPTION OF PREFERRED EMBODIMENTS

Figure 1:
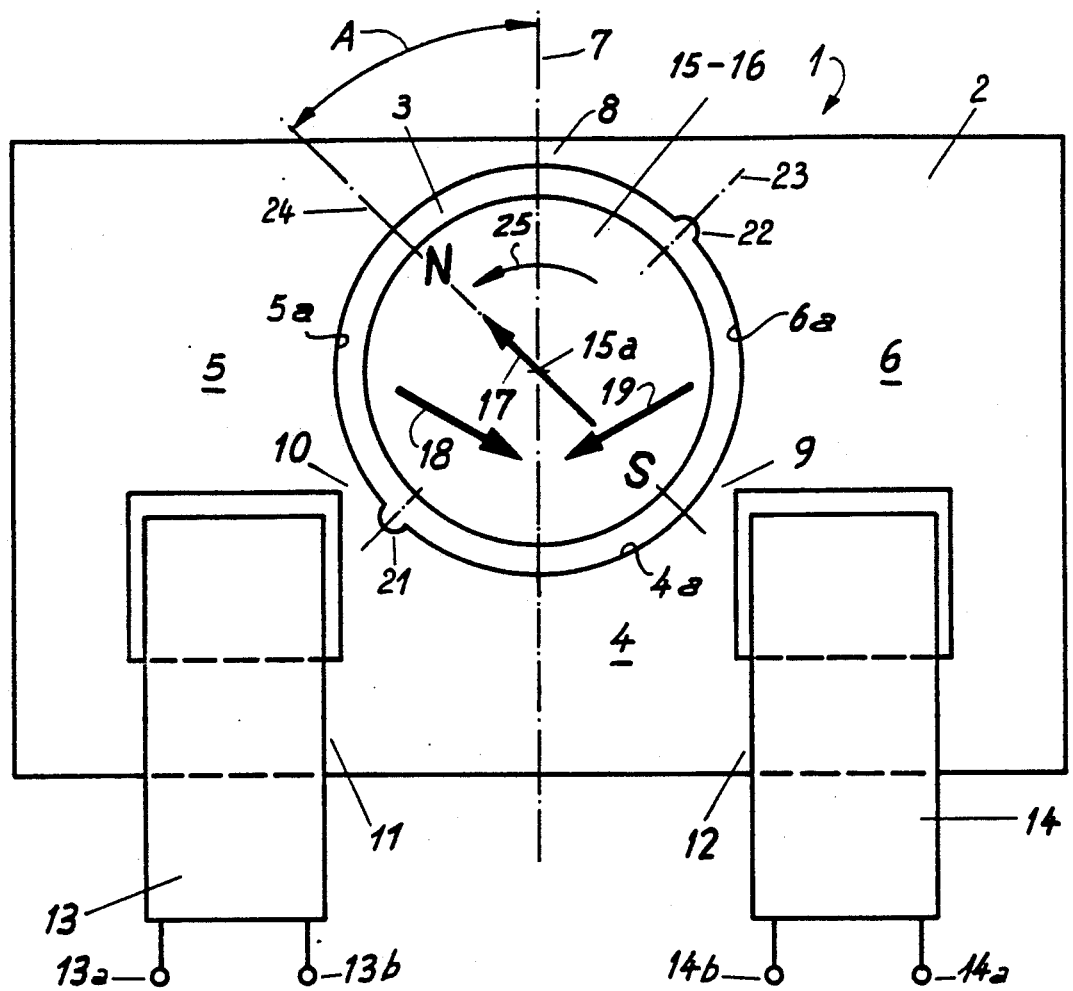
FIG. 1 is a diagrammatic plan view of one embodiment of the motor according to the invention.

Like one of the motors of the aforementioned U.S. Pat. No. 4,371,821, the motor 1 schematically illustrated in plan view in FIG. 1 by way of non-limiting example comprises a stator 2 through which there is a substantially cylindrical opening 3.

The cylindrical opening 3 is surrounded by three pole faces 4a, 5a and 6a which each extend over about 120° and are each situated at a first end of three pole pieces 4, 5 and 6 respectively.

The two pole faces 5a and 6a are arranged symmetrical to one another about an axis 7 which is the diameter of the opening 3 passing through the middle of pole face 4a. The latter is therefore itself arranged symmetrically about this axis 7.

The pole pieces 4, 5 and 6 are connected two by two by parts 8, 9 and 10 situated between the pole faces 4a, 5a and 6a and having dimensions selected in such a manner that their reluctance is much greater than that of the other parts of the stator 2.

The stator 2 further comprises two cores 11 and 12 which connect the second end of the pole piece 4 to the second end of pole piece 5 and to the second end of pole piece 6, respectively.

The motor 1 has two coils, designated by references 13 and 14, wound respectively on the cores 11 and 12. The terminals of coil 13, designated by references 13a and 13b, and the terminals of coil 14, designated by references 14a and 14b, are provided for connection with a control circuit, not shown in FIG. 1 but an embodiment of which will be described later.

The motor 1 further comprises a rotor 15 whose axis of rotation 15a coincides with the axis of the opening 3. The rotor 15 includes a permanent magnet 16 which is the only element of rotor 15 shown in FIG. 1 to avoid unnecessarily complicating the drawings.

In this example, the magnet 16 comprises only two magnetic poles indicated by N and S.

The coils 13 and 14 are of course magnetically coupled to magnet 16. Each of these coils is thus traversed by a part of the magnetic field produced by the magnet 16.

These partial magnetic fields each follow a closed path passing in particular across the opening 3 and the magnet 16 itself. These paths have not been represented in order to avoid unnecessarily complicating FIG. 1.

The field resulting, in this magnet 16, of the vectorial addition of these two partial magnetic fields has been schematically indicated in FIG. 1 by an arrow 17 and will be referred to as magnetic field 17 throughout the following description.

This magnetic field 17 is perpendicular to the axis of rotation 15a of rotor 15 and is directed from the south pole S towards the north pole N of magnet 16, as the axis of magnetization of this magnet 16. Moreover, when the rotor 15 turns about the axis 15a, this resultant field 17 also turns about the axis 15a in the same sense as and at the same speed as the rotor 15.

When the coil 13 is supplied with a current, which in the remainder of the description will be designated by reference I13, it creates a second magnetic field passing across the opening 3 and the magnet 16 perpendicularly to the axis of rotation 15a of rotor 15; the resultant of this field in magnet 16 is schematically indicated by arrow 18. To simplify the following description this resultant will be referred to as magnetic field 18.

The sense of arrow 18 in FIG. 1 indicates the sense of field 18 when the current I13 flows in the coil 13 from terminal 13a to terminal 13b. This sense of field 18 and this sense of current I13 will arbitrarily be designated as positive in the following description.

Likewise, when the coil 14 is supplied with a current designated by I14, it creates a third magnetic field also passing across the opening 3 and magnet 16 perpendicularly to the axis of rotation 15a; the resultant of this field in this magnet 16 is schematically indicated by arrow 19 and will be referred to as the magnetic field 19.

The sense of arrow 19 in FIG. 1 indicates the sense of field 19 when current I14 flows in the coil 14 from terminal 14a to terminal 14b. This sense of field 19 and this sense of current I14 will also arbitrarily be designated as positive.

In the following description, when reference will be made to the angles formed by the magnetic fields 18 and 19 relative to one another or to the resultant field 17, these angles will be, in accordance with the usual geometrical convention, the ones that would be made by the arrows schematically indicating the fields 17, 18 or 19 if these arrows were displaced parallel to themselves until their non-pointed ends coincide. In the example illustrated in FIG. 1, it can be seen that following this definition the fields 18 and 19 form an angle of about 120° relative to one another.

The motor 1 further comprises grooves 21 and 22 in the wall of the cylindrical opening 3. These grooves 21 and 22 are diametrally opposite one another and situated on a diameter 23 making an angle of about 45° with the axis of symmetry 7.

The provision of these grooves 21 and 22 causes the application to the rotor 15 of a positioning torque tending to maintain it in or return it to one of two stable equilibrium positions, or rest positions, in which the direction of the resultant field 17 is perpendicular to the diameter 23 and therefore makes with the axis of symmetry 7 an angle of about 45° designated by reference A in FIG. 1. This direction of the resultant field 17 will be referred to as the rest direction. It is shown in FIG. 1 by the dot-dash straight line 24.

In FIG. 1, the rotor 15 is in one of its rest positions, arbitrarily designated as the first rest position of rotor 15. The second rest position of rotor 15 will of course be the one where the sense of the resultant field 17 is opposite to that shown in FIG. 1.

Figure 2:
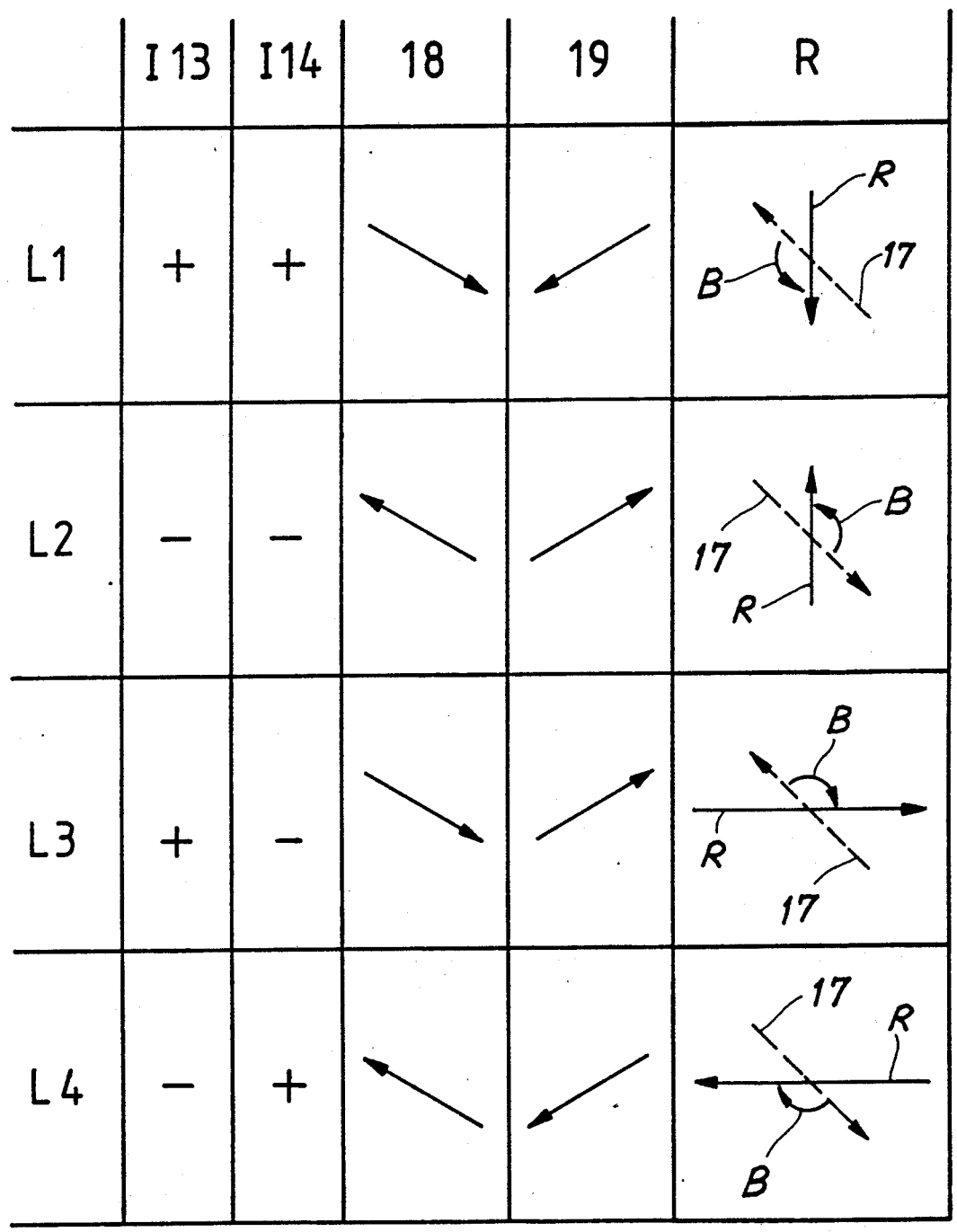
FIG. 2 is a table illustrating the method according to the invention when this method is used to control the motor of FIG. 1.

The table of FIG. 2 illustrates the method according to the invention for controlling the motor of FIG. 1.

Each of the rows L1, L2, L3 and L4 of this table corresponds to a drive pulse applied to the motor 1.

The sign + or the sign − in the columns designated by I13 and I14 indicates whether the current I13 or I14 respectively is positive or negative during the drive pulse corresponding to the row where it is located. In this example we will suppose that the currents I13 and I14 are equal at least in absolute value.

The arrows depicted in the columns designated by 18 and 19 indicate the direction and the sense of the field 18, 19 respectively produced in magnet 16 by the currents I13, I14 respectively. We will also suppose that in this example the coils 13 and 14 are identical and that the reluctances of the magnetic circuits, through which the fields produced by coils 13,14 pass, are equal. The strengths of the fields 18 and 19 are thus equal.

The arrows depicted in dashed lines in column R indicate the direction and the sense the resultant field 17 normally has at the beginning of the drive pulse corresponding to the row in which they are located.

For each row L1, L2, L3 and L4, the arrow depicted in a full line in the column R schematically illustrates the direction and the sense of a magnetic field R which results from the vectorial addition of the fields 18 and 19 produced in response to the currents I13 and I14 indicated in the same row.

It should be remarked that the arrows depicted in the columns 18, 19 and R have the same direction and the same sense as they would have if they were illustrated in FIG. 1.

It should be recalled that, in the embodiment of the motor 1 illustrated in FIG. 1, the pole face 4a is symmetrical relative to the axis of symmetry 7 and the pole faces 5a and 6a are symmetrical to one another about this same axis 7.

Furthermore, as the magnetic fields 18 and 19 are equal in this example, the resultant field R assumes a first direction parallel to the axis of symmetry 7, or even coincident with this axis 7, when the currents I13 and I14 have the same sense, or a second direction perpendicular to the first direction and thus to the axis of symmetry 7 when the currents I13 and I14 have opposite senses.

Row L1 of the table of FIG. 2 illustrates the drive pulse delivered to the motor 1 to turn its rotor 15 by one step in the sense indicated by arrow 25 in FIG. 1 starting from its first rest position. This sense of rotation indicated by arrow 25 will arbitrarily be called the positive sense of rotation.

During this drive pulse, the two coils 13 and 14 are simultaneously supplied in such a manner that both currents I13 and I14 flowing through them are positive. The magnetic fields 18 and 19 produced by the coils 13 and 14 in response to these currents therefore assume the direction and the sense indicated in row L1, and which incidentally are the same as those illustrated in FIG. 1.

In the conditions mentioned above, the magnetic field R resulting from the vectorial addition of the fields 18 and 19 thus assumes its first direction, that is the direction parallel to the axis of symmetry 7, and a sense directed towards the pole face 4a.

It can readily be seen that, because the rest direction 24 forms an angle of 45° with the axis of symmetry 7, the above-mentioned resultant field R forms, at the beginning of the drive pulse, an angle of 135° with the resultant field 17. This angle is designated by B in in column R of the table of FIG. 2. Its sense, measured from the resultant field 17 towards the resultant field R, is the same as that of arrow 25 of FIG. 1 and will also be referred to arbitrarily as the positive sense.

The interaction of fields R and 17 produces a drive torque which causes rotation of the rotor 15 in the positive sense, provided of course that the currents I13 and I14 have a sufficiently strong intensity. During this rotation of the rotor 15, this drive torque begins by increasing and passes through a maximum when the rotor 15 is located in the position where the resultant field 17 is perpendicular to the resultant field R, i.e. when it has turned through about 45°.

This drive torque then drops and, if the drive pulse is uninterrupted, reaches the value zero when the rotor 15 is in the position where the resultant field 17 has the same direction and sense as the resultant field R, i.e. when it has turned through about 135°.

In practice, the drive pulse is interrupted before the rotor 15 reaches this position, and the rotor 15 completes its step after interruption of the drive pulse in response in particular to the positioning torque produced due to the grooves 21 and 22, to its own kinetic energy and the kinetic energy of the various mechanical elements it drives.

When the rotor 15 has completed its step, it therefore occupies its second rest position.

Row L2 of the table of FIG. 2 illustrates the drive pulse applied to the motor 1 to turn its rotor 15 by one step in the positive sense from its second rest position.

During this drive pulse, the two coils 13 and 14 are energised simultaneously as before, in such a manner that the currents I13 and I14 flowing through these coils are both negative.

It can readily be seen that, in this case, the resultant field R also has its first direction but has a sense opposite to the sense it had during the drive pulse corresponding to row L1 of the table of FIG. 2.

The angle B formed by the resultant fields R and 17 thus once more has, at the beginning of the drive pulse, a value of 135° and its sense, always from the resultant field 17 towards the resultant field R, is also positive.

The rotor 15 is therefore once again submitted to a drive torque which causes it to rotate in the positive sense.

As in the previous case, the drive pulse is interrupted before the rotor 15 has turned through 135° and the rotor 15 finishes its step in response in particular to the positioning torque and its own kinetic energy as well as the kinetic energy of the various elements it drives.

When it has finished this step, the rotor 15 thus once again occupies its first rest position.

Row L3 of the table of FIG. 2 illustrates the drive pulse applied to the motor 1 to turn the motor 15 by one step in the negative sense starting from its first rest position.

During this drive pulse, the two coils are again supplied simultaneously, in such a manner that the current I13 is positive and the current I14 negative.

It can easily be seen that in these conditions the resultant field R assumes its second direction, that is the direction perpendicular to the axis of symmetry 7, and a sense directed from the pole face 5a towards the pole face 6a.

At the beginning of the drive pulse, the resultant field R once more makes an angle B of about 135° with the resultant field 17. But in this instance, the sense of this angle B ( still when it is measured from the resultant field 17 towards the resultant field R) is negative.

The rotor 15 is therefore submitted to a drive torque causing it to turn in the negative sense.

As above, the drive pulse is interrupted and the rotor 15 finishes its step in response in particular to the positioning torque, its own kinetic energy and the kinetic energy of the various mechanical parts it drives.

When the rotor 15 has finished this step, it thus occupies its second rest position.

Row L4 of the table of FIG. 2 illustrates the drive pulse applied to the motor 1 to turn the rotor 15 by one step in the negative sense starting from this second rest position.

During this drive pulse, the coils 13 and 14 are supplied, simultaneously once again, in such a manner that the current I13 is negative and the current I14 positive.

In these conditions, the resultant the resultant field R one more assumes its second direction, as in the previous case, but its sense is directed from the pole face 6a towards the pole face 5a.

At the beginning of the drive pulse, the resultant field R once more makes an angle B of 135° with the resultant field 17, and this angle B is once again negative.

The rotor 15 is therefore once again subjected to a drive torque causing it to rotate in the negative sense.

As in the preceding case, the rotor 15 finishes its step after the drive pulse has been interrupted in response in particular to the positioning torque and its own kinetic energy as well at the kinetic energy of the mechanical elements it drives.

In summary, it can be seen that to turn the rotor 15, the motor 1 is supplied with drive pulses during which the two coils 13 and 14 are always supplied simultaneously by voltages the polarity of which does not change.

Furthermore, these coils 13 and 14 are supplied in such a manner that the magnetic field R resulting from the vectorial addition of the magnetic fields 13 and 14 makes, at the beginning of each drive pulse, an angle B of about 135° with the resultant field 17, the sense of this angle B, measured from the resultant field 17 towards the resultant field R, being the sense in which the rotor 15 must turn.

Because the angle B formed by the resultant field 17 with the resultant field R at the beginning of each drive pulse has a value of 135°, the torque supplied by the motor 1 has a value which begins by increasing and then passes through a maximum value when the rotor 15 has turned by 45°, i.e. when the direction of the resultant field 17 is perpendicular to the direction of the resultant field R.

As in practice the drive pulse is generally interrupted when the rotor has turned through an angle of about 50° to about 70°, the torque produced by the motor 1 consequently has a value close to its maximum value during the entire duration of the drive pulse.

Furthermore, as the sense of the current in the coils 13 and 14 of motor 1 does not change during the entire duration of the drive pulses, there is no unnecessary power consumption and/or no risk of reversing the sense of rotation of the rotor as could happen at the end of the first part of the drive pulses when the motor is controlled in the manner described in the above-mentioned U.S. Pat. No. 4,371,821.

The result, all other things being equal, is that the efficiency of this motor 1 and its reliability of operation are greater than for the motor described in U.S Pat. No. 4,371,821.

The efficiency of the motor 1 is also greater than that of a motor controlled by the method described in U.S. Pat. No. 4,514,676 which was also mentioned above, due to the fact that its two coils are supplied simultaneously.

The value of the above-mentioned angle B, i.e. 135°, is the value at which the efficiency of motor 1 is greatest. It is nevertheless possible to select this angle B between about 110° and about 160° without the efficiency being reduced by too much. In particular, a value of angle B greater than 135° enables the motor 1 to produce a greater drive torque accompanied only by a slight increase in its power consumption.

Figure 3:
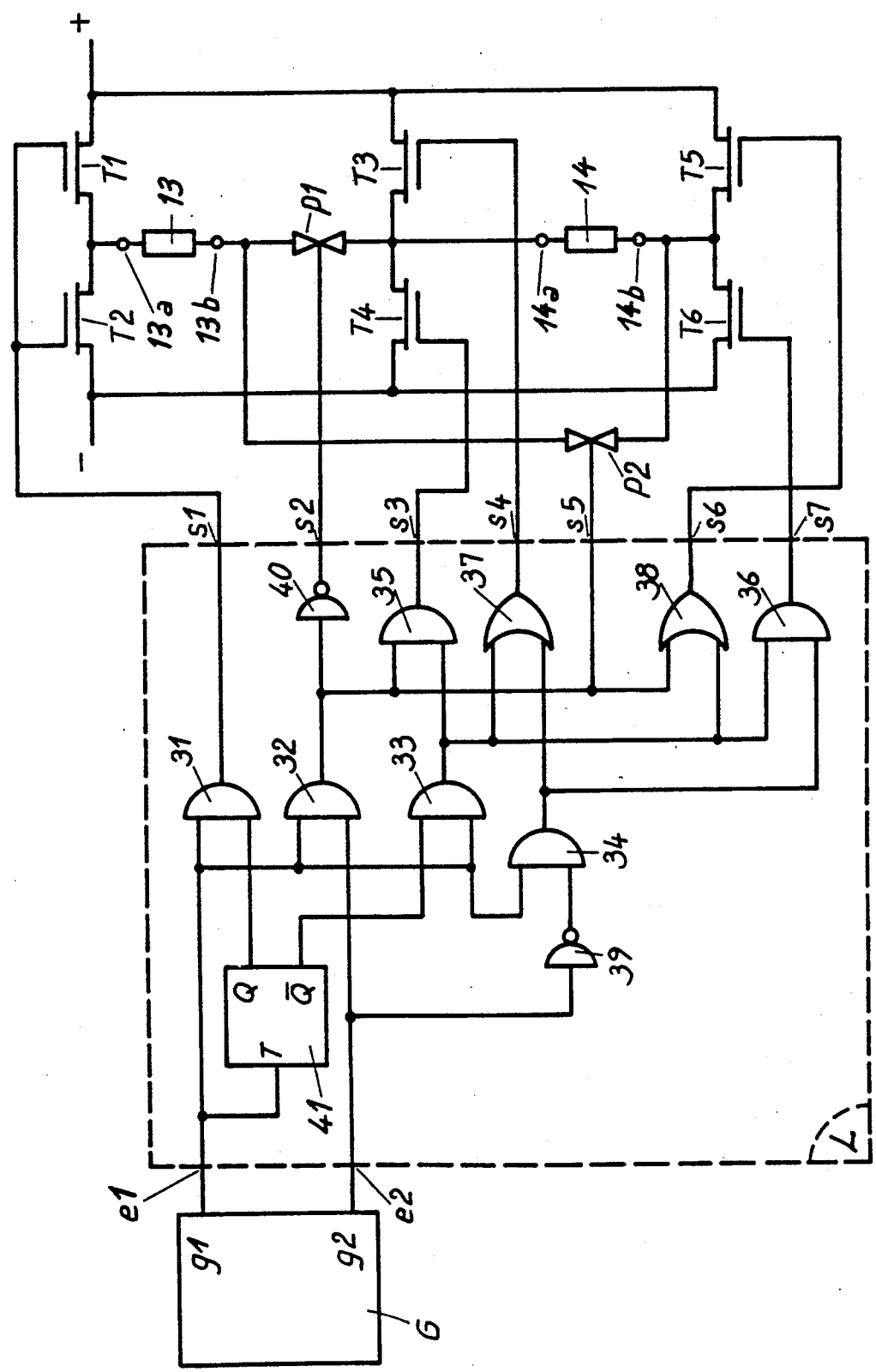
FIG. 3 is a diagram of one example of the control circuit of the motor of FIG. 1 for carrying out the method according to the invention.

FIG. 3 shows by way of non limiting example the diagram of a circuit by means of which the motor 1 of FIG. 1 can be controlled in the manner described above with reference to the table of FIG. 2.

In this diagram, the only parts of motor 1 shown are the coils 13 and 14 with their terminals 13a, 13b and 14a, 14b respectively.

The control circuit of FIG. 3 comprises six MOS transistors designated by references T1 to T6.

The transistors T1, T3 and T5 are p-type and their sources are connected to the positive pole + of a power supply, not shown.

The transistors T2, T4 and T6 are n-type and their sources are connected to the negative pole − of the same power supply.

We will suppose that the low and high logic states of the hereinafter mentioned signals correspond respectively to the potential of the negative terminal − and the potential of the positive terminal + of the mentioned power supply which also supplies the various electronic components to be described.

Consequently, the transistors T1, T3 and T5 are in the conducting or blocked state according to whether their gate has the low or high state, and the opposite is true for transistors T2, T4 and T6.

The drains of transistors T1 and T2 are both connected to the terminal 13a of coil 13.

The drains of transistors T3 and T4 are both connected to the terminal 14a of coil 14 and to one of the terminals of a transmission gate P1 whose other terminal is connected to the terminal 13b of coil 13.

The drains of transistors T5 and T6 are both connected to the terminal 14b of coil 14 and to one terminal of a transmission gate P2 whose other terminal is connected to the terminal 13b of coil 13.

It should be noted that, as usual, the transmission gates P1 and P2 are in the blocked or conducting state according to whether the signal applied to their control electrode is low or high.

The gates of transistors T1 to T6 and the control electrodes of the gates P1 and P2 are connected as shown to the outputs s1 to s7 of a logic circuit L comprising AND gates 31 to 36, OR gates 37 and 38, inverters 39 and 40, and a T-type flip-flop 41.

We will suppose that the outputs Q and $\overline{Q}$ of this flip-flop 41 change state each time the signal applied to the input T goes from high to low.

The interconnections of the various components of the circuit L and their connections with the outputs s1 to s7 will not be described in detail because the configuration of this circuit L, or a circuit performing the same functions, can easily be deduced from its operation that will be described below.

The circuit of FIG. 3 further comprises a control-signal generating circuit G whose outputs g1 and g2 are connected to the inputs e1 and e2 of logic circuit L.

Circuit G is arranged such that the signal it produces at its output g1, designated as signal g1, passes from low to high each time the motor 1 should receive a drive pulse, this signal g1 remains high during a period of time equal to the duration this drive pulse should have so that the rotor 15 of motor 1 turns properly by one step, and the signal g1 then returns to low.

This circuit G is furthermore arranged in such a manner that the signal it produces at its output g2, designated as signal g2, is permanently low or high according to whether the rotor 15 must turn in the positive or the negative sense.

The circuit G will also not be described in detail because its construction depends on the type of device equipped with the motor 1 and its design is readily apparent to the person skilled in the art.

It can readily be seen that, in the circuit of FIG. 3, the gates of all the transistors T1 to T6 and the control electrode of transmission gate P2 are low and that the control electrode of transmission gate P1 is high as long as the control signal g1 is low, independent of the state of signal g2. In this situation the transistors T1, T3 and T5 as well as gate P1 are in the conducting state, whereas the transistors T2, T4 and T6 as well as the gate P2 are blocked. The coils 13 and 14 are therefore short-circuited and no current flows in these coils.

When a drive pulse must be applied to the motor 1, the signal g1 passes to the high state and remains high during the entire duration that this drive pulse must have.

If the signal g2 and the output Q of the flip-flop 41 are low when the signal g1 passes to the high state, the transistors T3 and T5 block and the transistor T6 comes into the conducting state, the other transistors and the gates P1 and P2 remaining in the state they had previously.

A current thus flows from the + terminal to the − terminal of the power supply through transistor T1, coil 13, gate P1, coil 14 and transistor T6. In the coils 13 and 14, this current flows from the terminal 13a towards terminal 13b, and from terminal 14a towards terminal 14b respectively.

The current in the two coils 13 and 14 therefore flows in the sense designated as positive, and the drive pulse thus delivered to the motor 1 corresponds to what was described with reference to row L1 of the table of FIG. 2.

At the end of this drive pulse, i.e. when the signal g1 passes back into the low state, the transistors T3 and T5 go back into the conducting state and the transistor T6 is blocked again. Also, the output Q of the flip-flop 41 passes to the high state.

If the signal g2 is still low at the beginning of the following drive pulse, i.e. when the signal g1 returns to the high state, the transistors T1 and, once again, T3 block and the transistor T2 goes into the conducting state, the other transistors and gates P1 and P2 remaining in the state they are in when the signal g1 is low.

In these conditions, a current therefore flows from the + terminal to the − terminal of the power supply through the transistor T5, coil 14, gate P1, coil 13 and transistor T2. In the coils 13 and 14, this current flows from the terminal 13b towards the terminal 13a, and from terminal 14b towards terminal 14a, respectively.

In these two coils, the current therefore flows in the sense defined as negative, and the drive pulse corresponds to what was described with reference to row L2 of the table of FIG. 2.

At the end of this drive pulse, the transistors T1 and T3 once again pass in the conducting state, and the transistor T2 blocks again. Also, the output Q of flip-flop 41 goes back to the low state so that if the signal g2 remains low, the next drive pulse corresponds once again to row L1 of the table of FIG. 2.

If, however, the signal g2 is in the high state and the output Q of flip-flop 41 is low at the moment when signal g1 passes into the high state, the transistors T3 and T5 and the gate P1 block, whereas the transistor T4 and gate P2 go to the conducting state.

A current therefore flows from the + terminal to the − terminal of the power supply through the transistor T1, coil 13, gate P2, coil 14 and transistor T4. This current therefore flows in the positive sense in coil 13 and in the negative sense in coil 14, and the drive pulse corresponds to that described with reference to row L3 of the table of FIG. 2.

At the end of this drive pulse, the transistor T4 and gate P2 block once again and the transistor T4 and gate P1 once again take the conducting state. Also, the output Q of the flip-flop 41 passes to the high state.

If the signal g2 is still high when the signal g1 returns to the high state at the beginning of the next drive pulse, the transistors T1, once again, and T5 as well as, once again, gate P1 block, whereas the transistor T2 and, once again, gate P2 take the conducting state.

A current therefore flows from the + terminal to the − terminal of the power supply through the transistor T3, coil 14, gate P2, coil 13 and transistor T2. This current thus flows in the positive sense in coil 14 and in the negative sense in coil 13, and the drive pulse corresponds to that described with reference to row L4 of the table of FIG. 2.

At the end of this drive pulse, the transistors T1 and T5 as well as the gate P1 once again take the conducting state, whereas the transistor T2 and gate P2 block once again. Also, the output Q of the flip-flop 41 returns to the low state so that, if the signal g2 remains high, the next drive pulse corresponds once again to row L3 of the table of FIG. 2.

In the just-described example, the motor 1 is controlled in the so-called "constant voltage" mode because its coils 13 and 14, connected in series with one another in this particular instance, receive the voltage of the power supply of the control circuit during the entire duration of each drive pulse.

It is clear that the motor could equally well be supplied in the so-called "constant current" mode, i.e. in such a manner that the current flowing in the coils 13 and 14 is at least approximately constant during the entire duration of each drive pulse.

Such a circuit is, for example, described in European patent application EP-A-0057663, in an application where it is used to control a stepping motor with a single coil and having only one sense of rotation. The necessary modification of this circuit for use with the motor 1 with two coils 13 and 14 and two senses of rotation will not be described here as it is readily apparent to the person skilled in the art.

It is furthermore self evident that the control circuit of motor 1, of whatever type it may be, can be associated with a circuit for adjusting the duration of the drive pulses to the mechanical load driven by this motor. Many documents, which will not be listed here, describe such adjusting circuits which are therefore well known and will also not be described here.

When the coils 13 and 14 are controlled by a circuit such as that of FIG. 3, they are always connected in series with one another during the drive pulses.

Obviously, this is not the only possible connection: the coils 13 and 14 may also be connected in parallel during each drive pulse, or even in series when the rotor must turn in one sense and in parallel when the rotor must turn in the other sense.

Control circuits achieving these connections have not been illustrated because their design is readily apparent to the person skilled in the art.

It should also be noted that in the embodiment of motor 1 shown in FIG. 1, the fields 18 and 19 form an angle of about 120° when they are both positive or both negative and an angle of about 60° when one field is positive and the other negative.

If, additionally, as was supposed for the description of operation of the motor 1 with reference to FIG. 2, the magnetic fields 18 and 19 always have the same strength, designated by J, the strength of the resultant field R produced by their vectorial addition is different depending on whether they are both either positive or negative, or one positive and the other negative.

In the first case, which is when the rotor 15 turns in the positive direction, the strength of the resultant field R is equal to J, whereas in the second case, which is where the rotor 15 turns in the negative direction, it is equal to $\sqrt{3}.J$.

The torque produced by the motor 1, which is proportional to the strength of the resultant field R, is therefore $\sqrt{3}$ times greater when the rotor 15 turns in the negative sense than when the rotor 15 turns in the positive sense.

If necessary, various expedients can be employed to eliminate or at least reduce this variation of the torque produced by the motor 1 as a function of the sense of rotation of its rotor 15.

Figure 4:
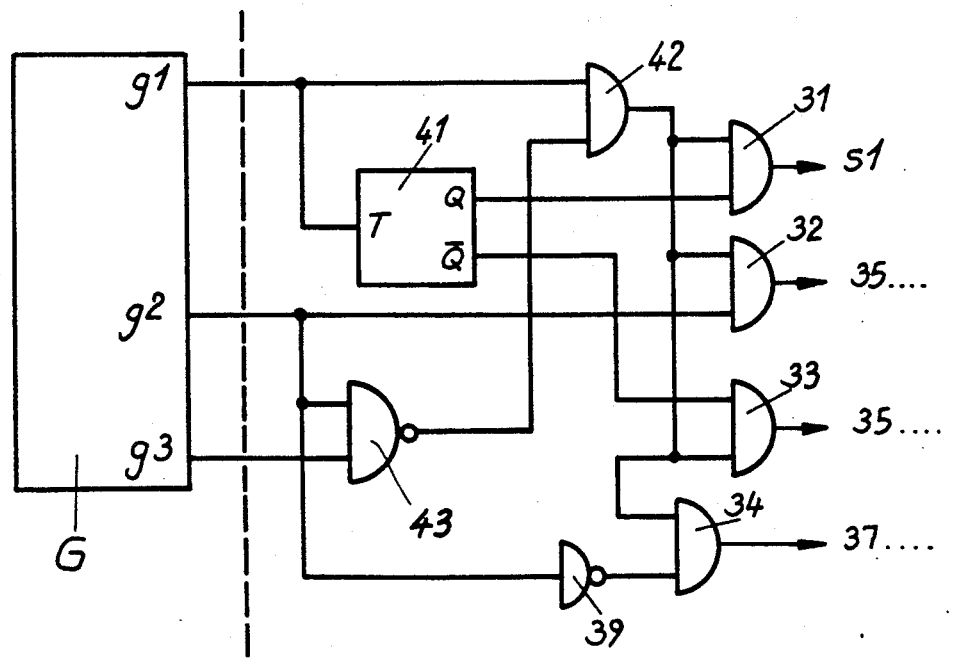
FIG. 4 is a diagram of part of another example of the control circuit of FIG. 1 also for carrying out the method according to the invention.

Thus, for example, it is possible to modify the control circuit of FIG. 3 in the manner illustrated in FIG. 4.

The gates 31 and 34, the inverter 39 and flip-flop 41 shown in FIG. 4 are identical to the elements of FIG. 3 having the same references. Also, the outputs of gates 31 to 34 are connected in the same manner and to the same elements as in FIG. 3. The latter elements are not shown in FIG. 4.

In addition to outputs g1 and g2 which deliver the same signals as the outputs g1 and g2 of FIG. 3, the circuit G of FIG. 4 comprises an output g3 which delivers a signal formed by a succession of periodic pulses designated as pulses g3. For a reason which will become apparent later, the period of pulses g3 is short relative to the duration of the drive pulses.

The circuit of FIG. 4 also comprises an AND gate 42 whose output is connected to the inputs of gates 31 and 34 which are connected, in FIG. 3, to the output g1 of circuit G. The inputs of gate 42 are respectively connected to this output g1 of circuit G and to the output of a NAND gate 43.

The inputs of gate 43 are connected to the output g2 and to the output g3 of circuit G.

It can readily be seen that, when the signal g2 is in the low state, i.e. when the rotor 15 must turn in the positive sense, the circuit of FIG. 4 operates exactly like that of FIG. 3.

However, when the signal g2 is in the high state, i.e. when the rotor 15 must turn in the negative direction, the coils 13 and 14 are periodically disconnected from the current source and are short-circuited, each time the signal g3 is in the high state. The current flowing in coils 13 and 14 is not interrupted when signal g3 is high, because these coils have a certain inductance and they are short-circuited. But, of course, the magnitude of this current at any instant is less than what it would be if the coils 13 and 14 remained permanently connected to the power supply.

It therefore suffices to select the cyclic ratio of pulses g3 in such a manner that this current is reduced by a factor of $\sqrt{3}$. The torque produced by the motor 1 is then the same for either sense of rotation of rotor 15.

In the motor 1 shown in FIG. 1, the magnet 16 of rotor 15 has only two magnetic poles, and the positioning means for this rotor 15 constituted by the grooves 22 and 23 are arranged in such a manner that the rest direction of the resultant field 17 makes an angle A of 45° with the axis of symmetry 7.

This value of the angle A is particularly advantageous because it is the angle at which the efficiency of the motor 1 is greatest when it is controlled in the above-described particularly simple manner, i.e. when the currents I13 and I14 are equal.

It is however possible to arrange the positioning means of the rotor 15 in such a manner that the angle A is between about 20° and about 70° without modifying said manner of controlling the motor 1 and without its efficiency decreasing too much.

It is also possible to arrange the positioning means of the rotor 15 in such a manner that the angle A has any given value inside or outside the range 20° to 70° and to control the motor 1 in such a manner that its operation nevertheless is similar to what was described above.

In such a case, in general the currents I13 and I14 should be different from one another and, in addition, different according to whether the rotor 15 has to turn in one direction or the other.

This requirement is derived from the fact that the directions of the magnetic fields 18 and 19 are fixed for a given motor. It can readily be seen that if it is desired that the resultant field R forms with the resultant field 17 an angle B having a given value, for example about 135°, it is necessary that the strengths of the magnetic fields 18 and 19 and hence the intensities of the currents I13 and I14, be different from one another.

It can also be seen that, depending on the value of angle A, it is possible that, according to the above defined conventions regarding senses, the fields 18 and 19 and hence the currents I13 and I14 must have opposite senses to one another during drive pulses intended to turn the rotor 15 in the positive sense, and these currents I13 and I14 must have the same sense during drive pulses intended to turn the rotor 15 in the negative sense.

To describe the method of controlling the motor 1 in such a case, it is thus more convenient to define respectively as a first sense and a second sense of the current I13 or the current I14 the sense this current I13 or I14 has during drive pulses intended to cause the rotor 15 to turn in its first sense of rotation, from its first rest position and from its second rest position, respectively.

Using these definitions, and for any value of angle A, it can be stated that for the rotor 15 to turn in its first sense, the currents I13 and I14 must both alternately have their first and their second sense and, for the rotor 15 to turn in its second sense, the current I13 must alternately have its first and second senses and the current I14 must have its second sense when the current I13 has its first sense, and vice versa.

Knowing the angle A, it is easy to determine the intensities and the senses that the currents I13 and I14 must assume during each of the drive pulses for the angle B to take the desired value. This determination can be done by simple trigonometrical calculations that will not be described here.

Examples of motors in which the value of the angle A is different from 45° will also not be described as their construction, and also that of their control circuits, can readily be derived from the above explanations.

In the just-described example, the method according to the invention is employed for the control of a motor having three pole faces surrounding a permanent magnet with two magnetic poles, like the motor described in U.S. Pat. No. 4,371,821.

It is obvious to the person skilled in the art that this method can also be applied to the control of any other motor falling under the definition given in the Field of the Invention and whose rotor comprises a permanent bipolar magnet as, for example, the motor described in the aforementioned U.S. Pat. No. 4,546,278.

Futhermore, it can readily be seen that whatever be the number P of magnetic poles of the rotor's magnet (defining P discrete rest positions of the rotor), there is always, in the permanent magnet, a magnetic field similar to the resultant field 17 described for the case of the motor 1 of FIG. 1, i.e. a resultant field produced by the vectorial addition of the two partial fields produced by the magnet and each flowing through one of the coils.

Still for any given number P of magnetic poles of the rotor's magnet, this resultant field has a direction and a sense which depend on the angular position of the rotor, and it turns by 180° in the same sense as the rotor each time the latter turns through an angle equal to the angle that separates two adjacent magnetic poles in the permanent magnet, namely 360°/P or, which is equivalent, through an angle equal to the angle separating two successive rest positions of the rotor.

As in the case of a motor having a rotor with a bipolar magnet, which is simply a specific case for a magnet in which said number P is equal to 2, it is the interaction of this resultant field with that produced by the coils in response to the currents flowing through them that produces the drive torque causing rotation of the rotor.

The method according to the invention, which has been described above in the case where it is used to control a motor whose rotor has a bipolar magnet, therefore also applies unchanged to the control of any motor conforming to the definition given in the Field of the Invention, even if the rotor of this motor has a magnet with more than two magnetic poles.

This method will therefore not be described once again for the case where it is used to control such a motor.

It is also clear that such a motor whose rotor has a permanent magnet with more than two magnetic poles is also particularly well adapted to be controlled by the above-described method when the positioning means for its rotor are arranged in such a manner that the resultant field similar to the above-defined field 17 makes, in each of the rest positions of the rotor, an angle preferably equal to about about 45° with the axis of symmetry of the directions of the magnetic fields produced in the permanent magnet by the coils of the motor when a current flows through theses coils. This angle, which is similar to the angle A of FIG. 1, may thus have a value between 20° and 70° without operation of the motor being substantially affected.

Such a motor has not been shown, as it can be identical to the motor 1 of FIG. 1 except that the bipolar magnet 16 has simply been replaced by a magnet having more than two magnetic poles.

I claim:

1. A method of controlling a stepping motor rotatable in both senses, said motor comprising :
    a rotor comprising a permanent magnet producing a first magnetic field;
    a first coil, traversed by a first part of said first magnetic field and intended to produce a second magnetic field in response to a first current;
    a second coil, traversed by a second part of said first magnetic field and intended to produce a third magnetic field in response to a second current, said first and second parts of the first magnetic field forming in said permanent magnet a first resultant field; and
    positioning means for maintaining said rotor in or for returning said rotor to any one of a plurality of rest positions;
    said method comprising the production of said currents and the simultaneous supply thereof to the coils each time said rotor must turn by one step, said currents being produced with the same sense during the entire duration of their supply to said coils and with intensities such that, at the beginning of said current supply and when the rotor occupies one of said rest positions, said first resultant field forms an angle having a value between about 110° and about 160° with a second resultant field produced in said permanent magnet by said second and third magnetic fields, said senses of said currents being furthermore such that said angle has a sense, when measured from the first resultant magnetic field towards the second resultant magnetic field, which is the sense in which the rotor should turn.

2. The method of claim 1, wherein said angle is substantially equal to 135°.

3. The method of claim 1, wherein said positioning means are arranged in such a manner that in each of said rest positions of the rotor said first resultant field makes, with a reference axis which is one of the axes of symmetry of the directions of said second and third magnetic fields in said permanent magnet, an angle substantially equal to 45°, said first and second currents being produced with substantially equal intensities.

4. A stepping motor rotatable in both senses, comprising:
    a rotor comprising a permanent magnet producing a first magnetic field;
    a first coil for producing a second magnetic field and traversed by a first part of said first magnetic field;
    a second coil for producing a third magnetic field and traversed by a second part of said first magnetic field said first and second parts of a first magnetic field forming in said permanent magnet a resultant magnetic field;
    first means for applying said second magnetic field to said permanent magnet in a first direction;
    second means for applying said third magnetic field to said permanent magnet in a second direction symmetrical to said first direction relative to an axis of symmetry; and,
    positioning means for maintaining said rotor in or returning said rotor to any one of a plurality of rest positions, said positioning means being arranged in such a manner that, in each of said rest positions, the resultant magnetic field formed in said permanent magnet by said first and second parts of the first magnetic field makes angle from about 20° to about 70° with said axis of symmetry.

5. A stepping motor according to claim 4, wherein said angle is substantially equal to 45°.

6. A stepping motor rotatable in both senses, comprising:
    a rotor comprising a permanent magnet producing a first magnetic field;
    a first coil for producing a second magnetic field in response to a first current and traversed by a first part of said first magnetic field;
    a second coil for producing a third magnetic field in response to a second current and traversed by a second part of said first magnetic field, said first and second parts of the first magnetic field forming in said permanent magnet a first resultant field;

first means for applying said second magnetic field to said permanent magnet in first direction;

second means for applying said third magnetic field to said permanent magnet in a second direction symmetrical to said first direction relative to an axis of symmetry;

positioning means for maintaining said rotor in or for returning said rotor to any one of a plurality of rest positions; and means for simultaneous supply of said currents to the coils each time said rotor must turn by one step, said currents being produced with the same sense during the entire duration of their supply to said coils and with intensities such that, at the beginning of said current supply and when the rotor occupies one of said rest positions, said first resultant field forms an angle having a value between about 110° and about 160° with a second resultant field produced in said permanent magnet by said second and third magnetic fields, said senses of said currents being furthermore such that said angle has a sense, when measured from the first resultant magnetic field towards the second resultant magnetic field, which is the sense in which the rotor should turn.

7. A stepping motor according to claim 6, wherein said positioning means is arranged in such a manner that, in each of said rest positions, the first resultant magnetic field formed in said permanent magnet by said first and second parts of the first magnetic field makes an angle from about 20° to about 70° with said axis of symmetry.

8. A stepping motor according to claim 7, wherein said angle with said axis of symmetry is substantially equal to 45°.

* * * * *

UNITED STATES PATENT AND TRADEMARK OFFICE
CERTIFICATE OF CORRECTION

PATENT NO. : 5,028,857
DATED : July 2, 1991
INVENTOR(S) : Daho Taghezout It is certified that error appears in the above-identified patent and that said Letters Patent is hereby corrected as shown below:

Title page, second column, between lines 2 and 3, insert
--Attorney, Agent, or Firm-Pollock, Vande Sande & Priddy--.

Column 16, line 40, after "field" insert --,-- and change
"a" to --the--.

Column 16, line 55, after "makes" insert --an--.

Signed and Sealed this

Sixth Day of October, 1992

*Attest:*

DOUGLAS B. COMER

*Attesting Officer*   Acting Commissioner of Patents and Trademarks